United States Patent [19]
Takeuchi et al.

[11] Patent Number: 6,030,726
[45] Date of Patent: Feb. 29, 2000

[54] LITHIUM SECONDARY BATTERY HAVING NEGATIVE ELECTRODE OF CARBON MATERIAL WHICH BEARS METALS

[75] Inventors: Seiji Takeuchi, Hitachioota; Hidetoshi Honbo, Hitachi; Yasushi Muranaka, Hitachinaka; Shuko Yamauchi, Hitachi; Masanori Yoshikawa, Hitachinaka, all of Japan

[73] Assignee: Hitachi, Ltd., Tokyo, Japan

[21] Appl. No.: 08/866,250

[22] Filed: Jun. 5, 1997

[30] Foreign Application Priority Data

Jun. 17, 1996 [JP] Japan ................................ 8-155115
May 20, 1997 [JP] Japan ................................ 9-129486

[51] Int. Cl.$^7$ ........................................................ H01M 4/02
[52] U.S. Cl. .................................. 429/231.8; 429/231.95
[58] Field of Search .................... 429/231.8, FOR 109, 429/231.4, 231.95

[56] References Cited

U.S. PATENT DOCUMENTS

| | | | |
|---|---|---|---|
| 5,401,598 | 3/1995 | Miyabayashi et al. | 429/231.8 |
| 5,541,022 | 7/1996 | Mizumoto et al. | 429/231.8 |
| 5,656,394 | 8/1997 | Koksbang et al. | 429/231.8 |
| 5,702,845 | 12/1997 | Kawakami et al. | 429/231.8 |

FOREIGN PATENT DOCUMENTS

| | | |
|---|---|---|
| 2-121258 | 5/1990 | Japan . |
| 4-259764 | 9/1992 | Japan . |
| 5-299073 | 11/1993 | Japan . |
| 6-349482 | 12/1994 | Japan . |
| 7-335263 | 12/1995 | Japan . |
| 8-69797 | 3/1996 | Japan . |
| 8-273702 | 10/1996 | Japan . |

*Primary Examiner*—Maria Nuzzolillo
*Assistant Examiner*—Susy Tsang
*Attorney, Agent, or Firm*—Antonelli, Terry, Stout & Kraus, LLP

[57] ABSTRACT

A lithium secondary battery having a high energy density, a long life, a low cost, an improved safety and a high output density uses a high crystalline carbon or an amorphous carbon bearing fine particles of a metal which forms an alloy with lithium, and a metal which does not form any alloy with lithium, in the range of 5–10% by weight, as a material for the negative electrode thereof.

15 Claims, 3 Drawing Sheets

LITHIUM SECONDARY BATTERY HAVING NEGATIVE ELECTRODE OF CARBON MATERIAL WHICH BEARS METALS

BACKGROUND OF THE INVENTION

The present invention relates to a lithium secondary battery; and, more particularly, the invention relates to a negative electrode for a lithium secondary battery, which has large values of discharging capacity, output power density and charging-discharging velocity, and superior cycle characteristics. The lithium secondary battery can be utilized as a driving power source for electric vehicles, for memory back up, for a portable apparatus, and the like. For instance, lithium secondary batteries are assembled into electronic apparatus, such as note type personal computers, word processors, portable telephones, cordless telephones, portable facsimile machines, portable printers, headphone stereos, video movies, liquid crystal TV sets, handy cleaners, portable CD players, electric shavers, electronic translators, automobile telephones, transceivers, electric tools, memory cards, and the like.

The lithium secondary batteries can also be used as power sources for consumer goods, such as medical apparatus, for instance, pace makers, hearing aids, massagers, and the like. Furthermore, the lithium secondary batteries can be utilized as the power sources of apparatus designed for use in outer space. The lithium secondary batteries can be used as power sources by being combined with solar cells.

As the negative electrode for a lithium secondary battery, lithium metal (Li) and alloys such as Li—Al, Li—Pb, and the like have been used. However, the above conventional battery has defects, such as the tendency to cause a short circuit between the negative electrode and the positive electrode of the battery by precipitation of a resin-like lithium, and the conventional battery also has defects, such as a short cycle life and a low energy density. Currently, in order to overcome the above-mentioned defects, research on using carbon for the negative electrode is being actively pursued. For instance, some carbon negative electrodes have been disclosed in JP-A-5-299073 (1993), JP-A-2121258 (1990), JP-A-6-349482 (1994), and JP-A-7-335263 (1995). The composition disclosed in JP-A-5-299073 (1993) uses a carbon complex body comprising high crystalline carbon particles forming a core, the surfaces of which are coated with a film including metallic elements of VIII group, and the film is further coated with carbon, as an electrode material. Thereby, the carbon material having a random layer structure enhances intercalation of lithium, and concurrently, the large surface area of the electrode significantly improves the charging-discharging capacity and the charging-discharging velocity. In accordance with JP-A-2-121258 (1990), a long charging-discharging cycle life and preferable charging-discharging characteristics with a large current can be obtained by using a mixture of carbon material having hexagonal crystals, of which H/C<0.15, spacing >3.37 Å, and Lc<150 Å, where, Lc is a size of crystal lattice in a C-axis direction, and a metal which can form an alloy with lithium. In accordance with JP-A-6-349 482 (1994), a carbon complex body, wherein copper oxide is deposited onto all or a part of the surface of graphite particles, which allows intercalation-deintercalation of lithium, is used as an electrode material. Thereby, increasing the capacity becomes possible, because a complex oxide of lithium and copper is formed reversibly onto the copper oxide, which is electrochemically reduced. In accordance with JP-A-7-335 263 (1995), the contact resistance between active materials can be reduced by adding a metal, as a conductivity assistant agent, to the carbon for use as an active material in the negative electrode or the positive electrode. The contact resistance between a collector and the active material can also be reduced by the addition of the metal to the carbon, as mentioned above, and accordingly, a decrease in the capacity can be suppressed as much as possible, even with a high rate of discharging (a large current discharging). Regarding only the negative electrode, an orientation of carbon can be prevented by adding an alloy, such as stainless steel, permalloy, and the like, in addition to a metallic carrier, such as nickel, copper, silver, aluminum, and the like, to the carbon. As a result, a large current discharging becomes possible, because a fraction of the carbon particles, the side plane of which is oriented to face the electrolyte, is increased, and a diffusion of the ions is facilitated. The inventors of the present invention have proposed a lithium secondary battery having an increased capacity, an increased power density, and superior cycle endurance characteristics, in JP-A-8-273702 (1996), wherein carbon particles bearing particles made of a metal, which can form an alloy with lithium, of utmost 100 Å in diameter at their surfaces, are used as the negative electrode material. However, in any case, the power density was not sufficiently increased, because preparation of the negative electrode was difficult, and the theoretical capacity of the carbon was not utilized. Particularly, an issue such as a remarkable improvement in an aspect of the rapid charging-discharging (a large current charging-discharging) remained to be solved. Accordingly, the lithium secondary battery was insufficient in energy density and power density for use on electrical vehicles and motorcycles.

As mentioned above, when the carbon material or the carbon complex material was used as a material for the negative electrode, problems remained, such as the theoretical capacity of the carbon not being utilized, the preparation of the carbon material for the negative electrode being difficult, and the fast charging-discharging (a large current charging-discharging) being impossible, and so these problems remained to be solved.

SUMMARY OF THE INVENTION

The inventors of the present invention have been engaged in research for solving the above mentioned problems, and, as a result, an improved lithium secondary battery having an increased capacity, a capability of fast charging-discharging operation, and superior cycle endurance characteristics was realized by using a negative electrode composed of a special composition. One of the objects of the present invention is to provide the improved lithium secondary battery mentioned above.

The inventors of the present invention discovered the following finding, and the present invention was conceived based on this finding.

First, the cycle characteristics 1 of the conventional negative electrode and the cycle characteristics 2 of the improved negative electrode were investigated, and a result of a determination of these cycle characteristics is shown in FIG. 1. The carbon material used for the negative electrode was natural graphite treated for purification, and its average particle size was approximately 11 µm. A diethylbenzene solution of ethylene-propylene-diene terpolymer (abbreviated as EPDM, hereinafter) was added to the carbon material as a binder to make a paste, wherein a ratio by weight of the carbon material and the EPDM was 94:6, and the paste was applied onto a collector made of a copper foil of 20 μm thickness. Separately, the paste was filled into another collector made of porous copper metal having a three dimensional network structure of 0.9 mm thickness and a porosity of 93%. Hereinafter, the former will be referred to as a conventional negative electrode, and the latter will be referred to as an improved negative electrode. Both collectors were dried in a vacuum at 80° C. for 3 hours after being dried in air, and thereafter the collectors were fabricated into a negative electrode, respectively, using a pressure of 0.5 ton/cm$^2$, and subsequently the fabricated negative electrodes were dried in a vacuum at 150° C. for 2 hours. A testing cell was assembled by causing one of the negative electrodes to face an opposed electrode made of lithium metal with a separator made of a fine porous polypropylene film, which was interposed between the above mentioned two electrodes. An electrolysis solution of 1 mol of LiPF$_6$ /ethylenecarbonate-dimethoxyethane (abbreviated as EC-DME, hereinafter), and a reference electrode made of lithium metal were used in the above mentioned testing cell. Using the above mentioned testing cell, cycle tests on respective ones of the above mentioned conventional negative electrode and the improved negative electrode were performed with a charging and discharging velocity of 120 mA per one gram of carbon, and a potential width of 0.01~1.0 V.

The result of the cycle tests revealed that, as shown in FIG. 1, when the conventional negative electrode 1 was used, the discharging capacity was decreased per cycle, and after approximately 500 cycles, the discharging capacity was decreased to approximately 60% of the initial discharging capacity. On the contrary, when the improved negative electrode 2 was used, the decrease in the discharging capacity even after 500 cycles was as small as 4.5%, and so a significant advantage in the improvement of the collector was recognized. The above mentioned experimental fact can be deemed to result from the fact that decreasing the electric collecting effect between the carbon particles, which occurs on account of swelling of the electrode caused by volume changes with the repeated charging-discharging, can be suppressed by the improved electrode having a three dimensional network structure. Then, in order to verify the above mentioned assumption, the following second experiment was performed. That is, it was studied whether the same advantage as obtained in the above experiment can be obtained if any metallic fiber is added to the negative electrode material.

The result of the second experiment is shown in FIG. 2. The second experiment, the results of which are shown in FIG. 2, was performed almost in the same way as the first experiment, the results of which are shown in FIG. 1. Details of the second experiment are as follows.

The carbon material used for the negative electrode was artificial graphite having an average particle size of approximately 3 μm, and it was mixed with copper fiber of 10 μm in diameter to a ratio by weight of 90:10. A N-methyl pyrrolidone solution of polyvinylidene fluoride (abbreviated as PVDF, hereinafter) was added to the mixture as a binder to make a paste, wherein a ratio by weight of the mixture and the PVDF was 90:10, and the paste was applied onto a collector made of a copper foil of 20 μm thickness. The collector was dried in a vacuum at 80° C. for 3 hours after being dried in air, and "hereafter the collectors were fabricated into a negative electrode using a pressure of 0.5 ton/cm$^2$, and subsequently the fabricated negative electrodes were dried in a vacuum at 120° C. for 2 hours. A testing cell was assembled by causing the negative electrode to face an opposed electrode made of lithium metal with a separator made of a fine porous polyethylene film, which was interposed between the above mentioned two electrodes. An electrolysis solution of 1 mol of LiPF$_6$/ethylenecarbonate-dimethoxycarbonate (abbreviated as EC-DMC, hereinafter), and a reference electrode made of lithium metal were used in the above mentioned testing cell. The charging and discharging velocity was 120 mA per one gram of carbon, and the upper and the lower limits of the charging potential and the discharging potential were 1.0 V and 0.01 V, respectively. The obtained result is shown in FIG. 2. For reference, the characteristics of the conventional negative electrode 4, which does not contain the copper fiber, is shown in FIG. 2.

The result of the cycle tests reveals that, as shown in FIG. 2, the negative electrode 3 containing the copper fiber has a larger discharging capacity and exhibits a significantly smaller decrease of the discharging capacity per cycle in comparison with the negative electrode 4, which does not contain the copper fiber. The same result as that mentioned above was obtained with a negative electrode which contained copper powder instead of copper fiber.

On the basis of the above mentioned observation, the inventors of the present invention have found new functions, such as the fact that the increase in the electric collecting ability is important for improving the discharging capacity and the cycle characteristics; if the carbon material and the conductive fiber or the conductive powder are not simply mixed together, but the fine particles of metal which form an alloy with lithium are borne on the surface of the carbon, the same effect as the simple mixture of the carbon and the conductive material can be obtained with a smaller additive (bearing) amount of the metal as compared to the simple mixture of the carbon and the conductive material, and furthermore, an alloying capacity with lithium can be utilized; and the improvement in electric conductivity and thermal conductivity can be expected by coexisting the metal among the carbon particles; and so the inventors have filed a patent application (JP-A-7-15676 (1995)). In the cycle tests of the negative electrode disclosed in the previous patent application, the negative electrode indicated a stable performance until approximately 300 cycles.

As a result of further detailed investigation on the lithium secondary battery thereafter, it has been found that, using the carbon particles bearing fine particles of metals, the one of which forms an alloy with lithium and the other of which does not form any alloy with lithium, on the carbon, or the carbon particles bearing fine particles of an alloy of the metals for composing the negative electrode, it becomes possible unexpectedly to effect charging and discharging faster (a large current charging-discharging), that is, the discharging of an output power of at least 350 W of the energy density per one (1) kg of battery weight can be continued for at least 20 minutes, in addition to the advantages mentioned in the previous patent application, as compared to the ease using the carbon particles bearing fine particles of a metal, which does not form any alloy with lithium, for composing the negative electrode.

That means, the present invention relates to a lithium secondary battery characterized by forming the negative electrode of an unit cell, which composes the lithium secondary battery, with electric collectors comprising carbon particles bearing fine particles of metals, the one of which forms an alloy with lithium and the other of which does not form any alloy with lithium, on the carbon, or the carbon particles bearing fine particles of an alloy of the metals on the carbon.

The above mentioned lithium secondary battery having a capacity in the range of 0.5 wh~50 kwh is used. The lithium secondary battery comprising the above mentioned negative electrode is capable of continuing the discharging of an output power of at least 350 W of the energy density per one (1) kg of battery weight for at least 20 minutes. The fine particles of the above mentioned metal have preferably a particle diameter of, at the utmost, 1000 Å. The amount of the metal borne on the carbon is desirably, at the utmost, 30% to the total weight of the carbon and the metal, and preferably is in the range of 1~10 % by weight. The ratio by weight of the added amount of the metal which forms an alloy with lithium to the added amount of the metal which does not form any alloy with lithium is desirably in the range of 1:9~9:1, and preferably is in the range of 1:3~3:1.

Furthermore, the present invention relates to electric vehicles, and electric bicycles, which are provided with a motor, the power source of which is the lithium secondary battery of the present invention. The lithium secondary battery having a charging-discharging velocity of at least 1 C, and an energy density of at least 350 wh per liter of the battery volume, is used as the power source.

The carbon being used in the present invention is capable of intercalation and deintercalation of lithium, for instance, natural graphite; a readily graphite forming material obtainable from oil cokes or coal pitch cokes, which are thermally treated at a high temperature of at least 2,500° C.; mesophase carbon; amorphous carbon; and their mixture can be used. The average particle diameter of the carbon particles is, at the utmost, 50 $\mu$m, and preferably is in the range of 1~20 $\mu$m. The shape of the carbon particle can be spherical, massive, scaly, fibrous, and their pulverized particles.

The bearing metal which forms an alloy with lithium is at least one element selected from the group consisting of Al, Sb, B, Ba, Bi, Cd, Ca, Ga, In, Ir, Pb, Hg, Si, Ag, Sr, Te, Tl, and Sn. However, the element desirably satisfies the conditions that (1) its alloy composition has a large content of lithium, (2) its atomic weight is relatively small and its density is relatively large, (3) it is readily reducible, (4) an oxidation-reduction potential of its alloy with lithium is low, (5) its disposition has scarcely any problem, and (6) it is relatively inexpensive.

The metal which does not form any alloy with lithium is at least one element selected from the group consisting of Fe, Ni, Cu, Pt, and Au. However, the element desirably satisfies the conditions that (1) its oxidation potential is high, (2) it is readily reducible, (3) its disposition has scarcely any problem, and (4) it is relatively inexpensive.

There are various methods for bearing the metal on the carbon, such as, vapor deposition, spattering, a wet reduction, an electrochemical reduction, plating, and a gaseous phase reducing gas treatment, and an optimum bearing method corresponding to the kind of the selected metal is usable. The amount of the metal borne on the carbon is desirably, at the utmost, 30% to the total weight of the carbon and the metal, and preferably is in the range of 1~10% by weight. The ratio of the added amount of the metal which forms an alloy with lithium to the added amount of the metal which does not form any alloy with lithium is desirably in the range of 1:9~9:1 by weight, and preferably in the range of 1:3~3:1 by weight.

If the ratio of the added amount of the metal which forms an alloy with lithium to the metal which does not form any alloy with lithium is not in the above mentioned range, the advantage of fast charging-discharging (a large current charging-discharging) can not be obtained.

An alloy of the metal which forms an alloy with lithium, and the metal which does not form any alloy with lithium, is formed by a method, for instance, comprising the steps of bearing Cu and Sn on the carbon particles by wet reduction, drying the carbon particles, and thermally treating the dried carbon particles at a designated temperature in a reducing gas stream.

The particle diameter of the borne metal is desirably, at the utmost, 1000 Å in consideration of velocities of deposition and dissolution of lithium alloy during charging-discharging operation when the borne metal is formed by alloying, and of increasing the number of contact points among the carbon particles with respect to each other, which controls electronic conductivity, when the borne metal does not form any alloy. Furthermore, the particle diameter of the borne metal is desirably, at the utmost, 1000 Å in consideration of the velocities of deposition and dissolution of lithium metal during charging-discharging operation when the borne metal forms an alloy with lithium, and of increasing the number of contact points among the carbon particles with respect to each other, which controls electronic conductivity, when the borne metal does not form any alloy.

A binder is used when the negative electrode is prepared with the carbon particles bearing the metal, which are obtained in the manner mentioned above. The binder is not restricted to a special agent, but only to an agent which does not react with the electrolyte, such as EPDM, PVDF, polytetrafluoroethylene, and the like.

The added amount of the binder is desirably in the range of 1~30% by weight to the amount of the carbon, and preferably is in the range of 5~15% by weight to the amount of the carbon. The shape of the negative electrode composed of the above mentioned mixture can be a sheet, a film, a film on a metallic foil, or a porous metal impregnated with the mixture, and it is capable of being adjusted to the shape of the battery (ref. to FIG. 4). The thickness of the mixture is desirably in the range of 10~200 $\mu$m.

The negative electrode obtained in the manner mentioned above can be formed into an optimum lithium secondary battery by forming a combination with a conventional positive electrode, a separator, and an electrolyte. As an active material for the positive electrode, complex oxides containing lithium compounds, such as $LiCoO_2$, $LiNiO_2$, and $LiMn_2O_4$, are sufficiently usable, and the positive electrode can be formed by the steps of mixing a conductive agent, such as carbon black or carbon, and a binder with the active material, and applying the mixture onto an electric collector, such as an aluminum foil, and the like.

As the separator, a porous film made of a polypropylene group, polyethylene group, or polyolefine group material can be used. As the electrolytic solution, a mixed solvent obtained by mixing et feast two kinds of solvents selected from the group consisting of propylenecarbonate (PC), ethylenecarbonate (EC), 1,2-dimethoxyethane (DME), dimethoxycarbonate (DMC), diethylcarbonate (DEC), methylethylcarbonate (MEC), and the like, is used. As the electrolyte, $LiPF_6$, $LiPF_4$, $LiClO_4$, and the like can be used by dissolving them into the above solvent.

By using carbon particles bearing fine particles of the metal which forms an alloy with lithium and of the metal which does not form any alloy with lithium, or carbon particles bearing fine particles of an alloy of the above metals, for improving the carbon negative electrode for lithium secondary batteries, significant advantages are obtained, such as (1) the discharging capacity is increased, (2) the output power density is improved, (3) the electro-conductivity is improved, and the charging-discharging velocity is increased, (4) a charging-discharging capacity exceeding the theoretical capacity of graphite, i.e. 372 mAh/g, can be obtained, because the charging-discharging capacity of the alloy formed by the additive metal with lithium can be utilized, (5) the irreversible capacity can be reduced, because reaction sites on the surface of the carbon particles, which cause the irreversible capacity, are covered with the borne metal, (6) the output power density of the battery is naturally increased, because the discharging capacity is increased, (7) the cycle characteristics are improved with the improvement (2), and thermal radiation of a batteries can also be improved.

In order to achieve the above objects, the present invention provides lithium secondary batteries characterized in that they have electrodes, one of which is a positive electrode composed of a transition metal oxide including Mn.

As an active material for the positive electrode, a cheap Mn compound having a stable crystalline structure is used. Practically, such a Mn compound superior in cycle reversibility is $LiMn_2O_4$, or $Li_{1+x}Mn_{2-x}O_{4-z}$ ($0<x\leq0.3$, $0\leq z<2$), $Li_xMn_yM_{1-y}O_2$ ($0<X\leq1.3$, $0\leq y<1$, M: B, Al, Si, Ge, Ga, Fe, Cu, Co, Mg, Ca, Ti, V, Cr, Ni, Ag, Sn, at least one of secondary transition metallic elements), $Li_xMn_{2-y}M_yO_{4-z}$ ($0<X\leq1.3$, $0\leq y<2$, $0\leq z<2$ M: B, Al, Si, Ge, Ga, Fe, Cu, Co, Mg, Ca, Ti, V, Cr, Ni, Ag, Sn, at least one of secondary transition metallic elements), or $Li_xMn_{2-y}M_yO_{4-z}$ ($0<X\leq1.3$, $0\leq y<0.1$, $0\leq z<2$ M: at least one of B, Mg, and Ca), $Li_xMn_{2-y}M_yO_{4-z}$ ($0<X\leq1.3$, $0\leq y\leq0.3$, $0\leq z<2$ M: at least one of Al, Si, Ge, Ga, Fe, Cu, Co, Ti, V, Cr, and Ni).

Regarding the negative electrode, an improvement in the volume energy density and the cycle characteristics was achieved by using carbon material bearing fine particles of metal as carbon which can absorb and desorb Li ions. As the fine particles of the metal, a mixture of a metal which forms an alloy with lithium and a metal which does not form any alloy with lithium in a ratio by weight of 1:9 to 9:1, preferably in a ratio by weight of 1:3 to 3:1, is desirable. The bearing amount of the metal is desirably, at the utmost, 30% by weight to the total weight of the active material, and preferably is in a range from 1 to 10% by weight. The particle size is desirably as fine as, at the utmost, 1000 Å. The alloy here is defined as $LiSr_7$, that is, a metal having an atomic ratio of seven atoms of Sr per one atom of lithium. Therefore, taking a compound, composed of lithium atoms and atoms of another element containing the lithium atoms in the least ratio among the compounds listed in the JCPDS card, as a standard, the metal, which composes only a composition of which the lithium atomic ratio is less than 1/7 of the metallic atom, is defined as the metal which does not form any alloy with lithium, and the metal, which composes a composition of which the lithium atomic ratio is more than 1/7 of the metallic atom, is defined as the metal which forms an alloy with lithium.

The carbon used in accordance with the present invention is any carbon which can intercalate and deintercalate lithium, for instance, natural graphite, a carbon material obtained by heat treatment at least at 2500° C. of readily graphite forming carbon material obtained from petroleum cokes, coal pitch cokes, and the like, meso-phase carbon, or amorphous carbon, and one of their mixtures. An average diameter of the carbon particles is desirably less than 50 μm, and preferably is in the range of 1–20 μm. A carbon particle having a spherical, massive, flaky, fibrous, or pulverized form thereof can be used. The metal which forms an alloy with lithium is at least one element selected from the group consisting of Al, Sb, B, Ba, Bi, Cd, Ca, Ga, In, Ir, Pb, Hg, Si, Ag, Sr, Te, T1, and Sn. However, the element desirably satisfies the conditions that (1) its alloy composition has a large content of lithium, (2) its atomic weight is relatively small and its density is relatively large, (3) it is readily reducible, (4) an oxidation-reduction potential of its alloy with lithium is low, (5) its disposition has scarcely any problem, and it is relatively inexpensive. The metal which does not form any alloy with lithium is at least one element selected from the group consisting of Fe, Ni, Cu, Pt, and Au. However, the element desirably satisfies the conditions that its oxidation potential is high, it is readily reducible, and its resistance is small. The most preferable combination is the combination of elements, each of which has a specific resistance smaller than the resistance of lithium in a condition forming an alloy. Furthermore, the element having a thermal conductivity larger than that of the carbon material, which can readily transfer heat, is desirable. The most preferable example is where a graphite material bearing Ag—Cu, Sn—Cu is used for forming the negative electrode.

As the electrolysis solution, a non-protonic organic electrolysis solution prepared by dissolving a lithium salt as an electrolyte into an organic solvent is used. As the organic solvent, a solvent selected from a group consisting of esters, ethers, and 3-substituted-2-oxazolidinons, and a mixture of at least two kinds of them is used. Practically, for instance, an ester such as alkylene carbonate (for example, ethylene carbonate, propylene carbonate, γ-butyrolactone, 2-methyl-γ-butyrolactone, and the like), and aliphatic dimethyl carbonate, diethyl carbonate, ethylmethyl carbonate, and the like, an ether such as diethyl ether, dimethexyethane, diethexyethane, and a cyclic ether, for instance, a cyclic ether having a circle of five members such as tetrahydrofuran and its substituted compounds, and dioxolane, and a cyclic ether having a circle of six-members such as 1,4-dioxolane, pyran, dibydropyran, tetrahydropyran, and the like, are used. As the electrolyte, lithium perchlorate, lithium borofluoride, lithium chloroaluminate, lithium halide, lithium trifluoromethanesulfonate, $LiPF_6$, $LiAsF_6$, and $LiB(C_6H_5)_4$ are usable. Particularly, lithium phosphofluoride, lithium borofluoride, and lithium perchlorate are preferable. Especially, the advantage is significant when an electrolysis solution having an electric conductivity of at least 6mS/cm is used. However, the above examples do not restrict the organic electrolysis solution, and all organic electrolysis solutions containing lithium salt as the supporting electrolyte can be used.

In order to improve the volumetric energy density and cycle characteristics of the lithium secondary battery, a manganese group oxide containing lithium is used as a material for the positive electrode. The manganese group oxide containing lithium has a crystalline structure expressed by either of the formulas of $LiMn_2O_4$, and $Li_xMn_{2-y}M_yO_{4-z}$ (where, $0<x\leq1.3$, $0\leq y<2$, $0z<2$, M: at least one element selected from a group consisted of Al, Fe, Cu, Co, Mg, Ca, V, Ni, Ag, and Sn), which does not include $Mn_2O_3$, when a spinel type $LiMn_2O_4$ is used.

The theoretical capacity of spinel type $LiMn_2O_4$ is 148 Ah/kg, and is almost a half in comparison with that of $LiCoO_2$ of 274 Ah/kg. The present batteries are charged and discharged in the range of potentials wherein decomposition of the organic electrolysis solution does not occur. The capacity of $LiCoO_2$, wherein the $LiCoO_2$ can be utilized before reaching the decomposition potential of the organic electrolysis solution, is in the range of 130~150 Ah/kg. Only almost a half of the theoretical capacity can be utilized. On the other hand, for the spinel type $LiMn_2O_4$, a capacity in the range of 90~130 Ah/kg has been conventionally well known. It indicates that the range of 60~90% of the theoretical capacity can be used in the same range of potentials as the above. A latent remaining amount of lithium per unit weight in the spinel type $LiMn_2O_4$ is as small as an equivalent to the capacity of 50~80 Ah/kg in comparison with at least 120 Ah/kg-active material in $LiCoO_2$. However, the $LiMn_2O_4$ used for the positive electrode of the battery relating to the present invention has been improved in both the capacity and the cycle characteristics, because it has the following feature. That is, trivalent Mn atoms exist almost equivalent to tetravalent Mn atoms in a crystalline structure which does not include $Mn_2O_3$, and accordingly, a high capacity can be obtained. It has been found that the $LiMn_2O_4$, wherein a part of Mn positions are replaced with Li, is superior in cycle reversibility, and that the $LiMn_2O_4$, wherein a part of the Mn positions are replaced with another kind of element, has a preferable crystal stability, an improved capacity, and improved cycle characteristics.

The capacity, which can be utilized per unit weight of the active material, of the $LiMn_2O_4$ is in the range of 115~125 Ah/kg, and the amount of Li, which remains latently without being utilized, becomes lesser, such as an equivalent to the capacity in the range of 25~30 Ah/kg. Therefore, protection against an internal short circuit in the battery can be improved remarkably, because the absolute amount of metallic lithium, which deposits on the negative electrode by over-charging and the like, becomes significantly lesser than that of $LiCoO_2$. Packing an amount of negative electrode material, which can absorb lithium equivalent to approximately twice the battery capacity, into a predetermined volume in order to improve safety is a reason for decreasing the energy density of the battery. However, in accordance with the present invention, the volumetric energy density can be increased, because the safety can be increased under the condition wherein the amount of the material for the negative electrode is less than the amount of the material for the conventional electrode.

The use of carbon material, which is composed of carbon particles bearing fine particles of a metal which forms an alloy with lithium and of another metal which does not form any alloy with lithium, has advantages mentioned hereinafter. Conventionally, an amount of the active material for the positive electrode has been loaded in an amount more than necessary for the nominal capacity, as much as an estimated amount of lithium deactivated by the irreversible capacity of the carbon when assembling a battery, because carbon material has a large irreversible capacity. Therefore, in order to increase the energy density of the battery, a reduction of the irreversible capacity of the negative electrode is important. The irreversible capacity can be decreased by using a carbon material which beers a metal as the material for the negative electrode instead of the carbon material itself, such as graphite. One reason for this is assumed to be because active points of a reaction which causes the irreversible capacity of the carbon are covered with the metal which is borne by the carbon. With using the negative electrode, which bears metal, relating to the present invention, the irreversible capacity can be decreased by reducing the number of the irreversible capacity sites by the effect of the borne metal, and electronic conductivity of the negative electrode can be increased by bearing the metal which has a smaller resistance than the carbon material. Accordingly, a rapid charging-discharging operation becomes possible. Furthermore, the release of generated heat during the charging-discharging operation can be enhanced because the thermal conductivity of the negative electrode is increased, and a temperature raise of the battery due to accumulation of generated heat during the charging-discharging operation can be maintained as small as possible. When the negative electrode is formed with the carbon material bearing metal, an excess of lithium, which would deposit as lithium metal on the negative electrode composed of only carbon material when over-charging is performed, can be absorbed by forming an alloy, because the metal which can form an alloy with lithium is included partly in the metal borne by the negative electrode. Furthermore, an effect to increase the energy density per weight can be realized. Therefore, (1) increasing the discharging capacity, (2) increasing the electric conductivity, (3) increasing the thermal conductivity, and (4) improving the cycle characteristics have been achieved. Increasing the discharging capacity of the carbon negative electrode, improving the Coulomb efficiency, reducing the irreversible capacity, and discharging with a large capacity have become possible by optimizing the composition of the non-aqueous electrolysis solution containing the electrolyte. In accordance with the lithium secondary battery assembled with the above elements, the power characteristics and the cycle characteristics have been improved in addition to each of the above operations and effects. Accordingly, a synergistic effect, which makes it possible to realize a battery having a high energy density and improved safety, has been achieved.

In accordance with the above composition, an inexpensive lithium secondary battery having a positive electrode composed of a Mn group oxide, a high volume density, and superior charging-discharging characteristics can be provided by increasing the energy density of the negative electrode using carbon material bearing fine metallic particles. Furthermore, in accordance with the present invention, the volume energy density can be increased, and the volume of the battery necessary for maintaining a required battery capacity for an apparatus can be decreased. Therefore, the size of the apparatus itself can be decreased, or a grade up of function of the apparatus can be achieved by mounting additional devices into the space generated by reducing the volume of the battery.

Electric vehicles comprising a lithium secondary battery and a driving motor powered thereby can be provided with a power source for an electric vehicle having a sufficient output power density by using the lithium secondary battery of the present invention for the power source.

Electric and electronic home appliances, portable apparatus, personal computers, portable information terminals, portable electronic devices, and small scale electric power storage apparatus for the home comprising a lithium secondary battery and a driving motor powered thereby can be provided with a power source system having a long life and improved safety by adopting the lithium secondary battery of the present invention for the power source.

BRIEF DESCRIPTION OF THE DRAWINGS

These and other objects, features and advantages of the present invention will be understood more clearly from the following detailed description when taken with reference to the accompanying drawings, wherein.

DESCRIPTION OF THE PREFERRED EMBODIMENTS

Figure 1:
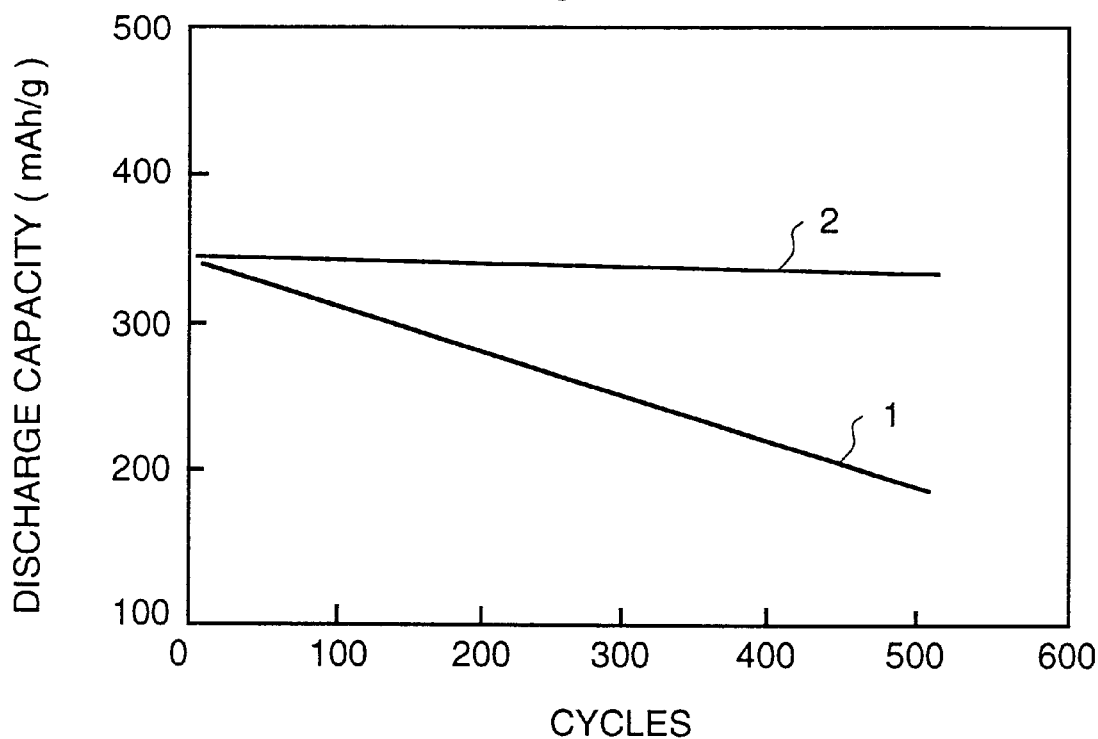
FIG. 1 is a graph indicating the cycle characteristics of a conventional negative electrode and the negative electrode of the present invention.
Figure 2:
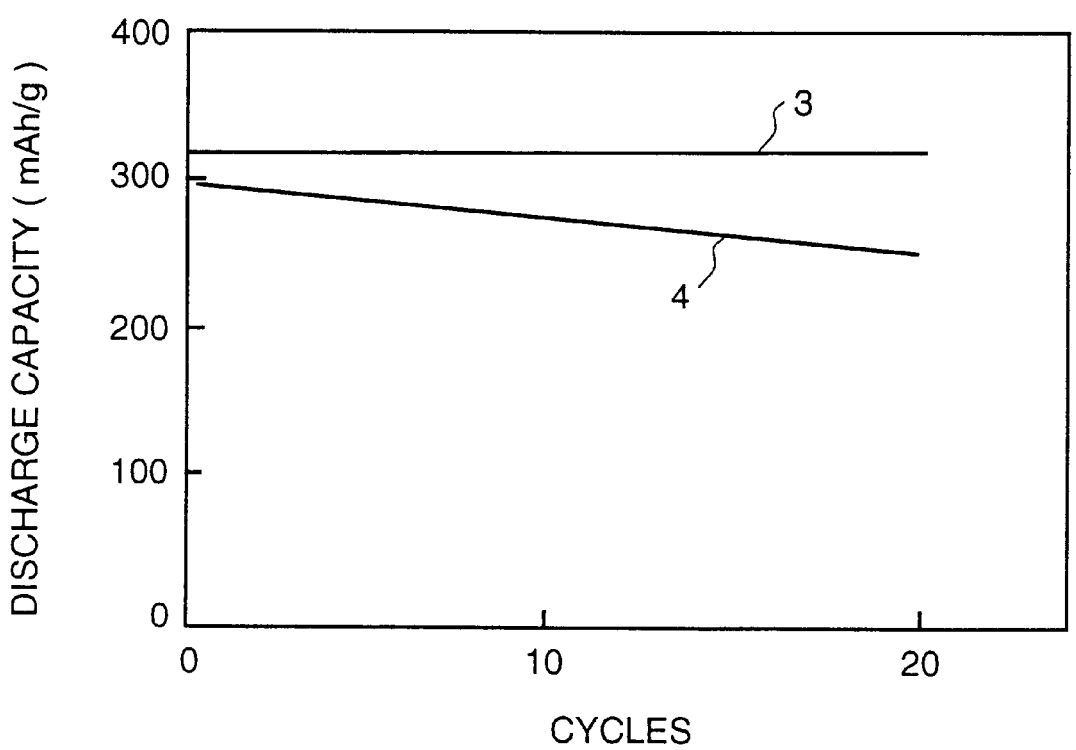
FIG. 2 is a graph indicating the cycle characteristics of a negative electrode to which is added copper fiber and the negative electrode with no addition of copper fiber.

Hereinafter, the present invention will be explained in detail based on various embodiments.

(Embodiment 1)

Artificial graphite treated for high purification (lattice spacing d002=3.359 Å, size of crystal lattice Lc=540 Å, specific surface area=10 $m^2/g$) in an amount equal to 9.5 g was suspended into 450 ml of water containing 25 ml of ethanol.

The suspension was heated to 55° C. While stirring vigorously, 0.39 g of silver nitrate ($AgNO_3$) and 0.95 g of copper nitrate ($Cu(NO_3)_2 \cdot 3H_2O$) were added and dissolved into the suspension. One hundred milliliters of water containing 8 ml of hydrazine ($N_2H_4$) was added dropwise to the solution with a micro-tube-pump for three hours to complete a simultaneous reducing reaction. Then, the reactant was filtered, washed, and the obtained solid body was dried at 350° C. for 6 hours in a vacuum. The metallic contents by chemical analysis in the obtained powder A were 2.45% by weight of Ag and 2.32% by weight of Cu in comparison with an added amount of 2.5% by weight of each element. Existing conditions of the Ag and Cu were studied by an X-ray diffraction method, and an extremely small diffraction line of cuprous oxide ($Cu_2O$) was observed in addition to diffraction lines of metallic Ag and metallic Cu. Then, the dispersing conditions of Ag and Cu were studied by energy dispersion type electronic probe microanalysis. It was found that the Ag and Cu particles were distributed on the whole surface of the graphite particles, and some concentration at the side surface of the graphite particles was observed. The size of the metallic particles was observed with a transmission electron microscope, and it was found that particles of hundreds angstroms in diameter were dispersed almost uniformly.

(Embodiment 2)

In accordance with the same procedure as embodiment 1, powder B was obtained using natural graphite treated for high purification (lattice spacing d002=3.362 Å, Lc=330 Å, specific surface area=20 $m^2/g$).

(Embodiment 3)

Artificial graphite treated for high purification in an amount equal to 9.5 g was suspended into 450 ml of water containing 25 ml of ethanol.

The suspension was heated to 55° C. While stirring vigorously, 0.39 g of silver nitrate ($AgNO_3$) and 1.24 g of nickel nitrate ($Ni(NO_3)_2 \cdot 6H_2O$) were added and dissolved into the suspension. An aqueous solution of sodium tetrahydride borate ($NaBH_4$) by 0.5 weight % was added dropwise to the solution with a micro-tube-pump for three hours to complete a simultaneous reducing reaction. Then, the reactant was filtered, washed, and the obtained solid body was dried at 350° C. for 6 hours in a vacuum. The metallic contents by chemical analysis in the obtained powder C were 2.44% by weight of Ag and 2.30% by weight of Ni in comparison with an added amount of 2.5% by weight of each element. Existing conditions of the Ag and Ni were studied by an X-ray diffraction method, and an extremely small diffraction line of NiO was observed in addition to diffraction lines of metallic Ag and metallic Ni. Then, the dispersing conditions of Ag and Ni were studied by energy dispersion type electronic probe microanalysis. It was found that the Ag and Ni particles were distributed on the whole surface of the graphite particles, and some concentration at side surface of the graphite particles was observed. The size of the metallic particles was observed with a transmission electron microscope, and it was found that the particles of hundreds angstroms in diameter were dispersed almost uniformly.

(Embodiment 4)

In accordance with the same procedure as embodiment 3, powder D was obtained using natural graphite treated for high purification.

(Embodiment 5)

Twenty five milliliters of ethanol and 450 ml of water were mixed together, and the mixture was heated to 55° C. Then, 0.5 g of potassium hydrogenphthalate was added and dissolved into the mixture. Subsequently, while stirring vigorously, 0.39 g of $AgNO_3$ and 0.95 g of $Cu(NO_3)_2 \cdot 3H_2O$ were added and dissolved into the solution. Then, 9.5 g of artificial graphite treated for high purification was added and suspended into the solution. While stirring vigorously, an aqueous solution of $NaBH_4$ by 0.5 weight % was added dropwise to the suspension with a micro-tube-pump for three hours to complete a simultaneous reducing reaction. Then, the reactant was filtered, washed, and the obtained solid body was dried at 350° C. for 6 hours in a vacuum. The obtained powder E was almost the same as the powder A obtained in embodiment 1, except for the smaller size of the metallic particles in the powder E than that in the powder A, and improved distribution of the metallic particles.

(Embodiment 6)

After dissolving 0.475 g of $SnCl_2 \cdot 2H_2O$ and 0.95 g of $Cu(NO_3)_2 \cdot 3H_2O$ into a mixture of 2 ml of acetic acid—25 ml of ethanol, the solution was diluted to 400 ml with distilled water. After suspending 9.5 g of artificial graphite treated for high purification into the above solution, the suspension was heated to approximately 50° C. While stirring vigorously, a reducing agent containing 1.7 g of $NaBH_4$ in 100 ml of water was added dropwise to the suspension to complete a reducing reaction. Then, powder F was obtained by filtering the reactant, washing, and drying the obtained solid body at 150° C. for 20 hours in a vacuum. In X-ray diffraction analysis of the powder F, the diffraction lines of metallic Cu and Sn and a trace of cuprous oxide in addition to the diffraction line based on graphite were observed.

(Comparative Example 1)

Powder G of 5% by weight Ag/artificial graphite was prepared by the same conditions as those of embodiment 5, except for adding only 0.98 g of $AgNO_3$.

(Comparative Example 2)

Powder H of 2.5% by weight Cu/artificial graphite was prepared by the same conditions as those of embodiment 5, except for adding only 0.95 g of $Cu(NO_3)_2 \cdot 3H_2O$.

(Embodiment 7)

Respective ones of the powder A~H obtained in the embodiments 1–6 and the comparative examples 1 and 2 were mixed with a N-methyl pyrrolidone solution of PVDF as a binder to form a paste, wherein a ratio by weight of the powder and the PVDF was 90:10. The paste was applied onto a collector made of a copper foil of 20 µm thickness. The collector was dried in a vacuum at 80° C. for 3 hours after being dried in air. Thereafter, the collectors were fabricated into each of the negative electrodes A~H using a pressure of 0.5 ton/$cm^2$, and subsequently the fabricated negative electrodes were dried in a vacuum at 120° C. for 2 hours. A negative electrode I was prepared by the same procedure as the above operations using only artificial graphite treated for high purification. A testing cell was assembled respectively using each of the above electrodes by causing the negative electrode to face an opposed electrode made of lithium metal with a separator made of a fine porous polypropylene film, which was interposed between the above mentioned two electrodes. An electrolysis solution of 1 mol of $LiPF_6$ /EC-DMC and a reference electrode made of lithium metal were used in the above mentioned testing cell. The charging and discharging velocity was 120 mA per gram of carbon, and the upper and the lower limits of the charging and the discharging potential were 1.0 V and 0.01 V, respectively. The obtained result is shown in Table 1 as the discharging capacity [mAh/g (carbon+metal)].

Figure 3:
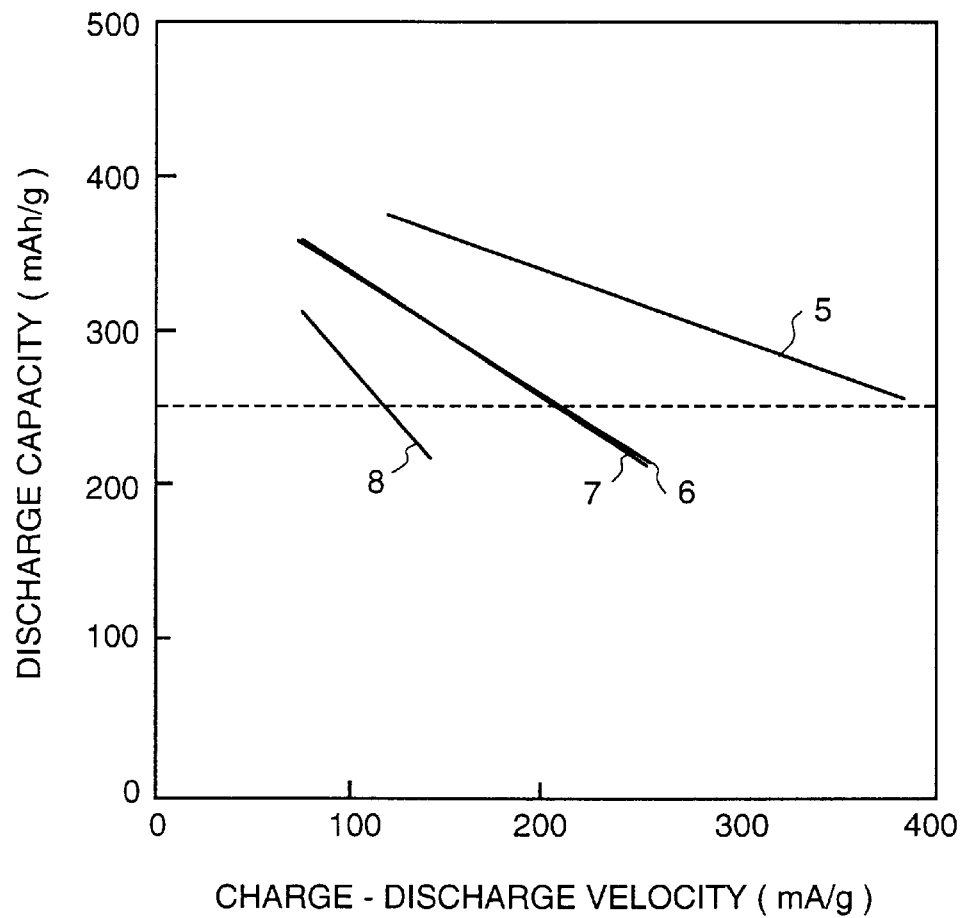
FIG. 3 is a graph indicating a relationship between the charging-discharging velocity and the discharging capacity of the conventional (Cu bearing) negative electrode 7, improved (Ag bearing) negative electrode 6, and the negative electrode of the present invention 5.

Furthermore, regarding the negative electrodes I, G, F, and E, variation of the discharging capacities, when the charging-discharging velocity is altered, was determined. The results of the determination are shown in FIG. 3. The negative electrode E of the present invention has a large discharging capacity even if the charging-discharging velocity is large, as shown in FIG. 3.

TABLE 1

| Negative electrode | Discharging capacity [mAh/g (carbon + metal)] |
| --- | --- |
| Negative electrode A | 370 |
| Negative electrode B | 365 |
| Negative electrode C | 360 |
| Negative electrode D | 360 |
| Negative electrode E | 375 |
| Negative electrode F | 365 |
| Negative electrode G (Comparative example 2) | 335 |
| Negative electrode H (Comparative example 2) | 320 |
| Negative electrode I (Graphite only). | 315 |

In accordance with the result shown in FIG. 3, it was revealed that a negative electrode relating to the present invention could endure rapid charging and discharging (a large current charging-discharging operation). For instance, taking the charging discharging velocity 8 of the negative electrode I made of only artificial graphite for maintaining a discharging capacity of 250 mAh/g as 1.0, the charging-discharging velocity 7 of the negative electrode G made of artificial graphite bearing only 5% by weight of Ag for maintaining a discharging capacity of 250 mAh/g is approximately 1.7, the charging-discharging velocity 6 of the negative electrode G made of artificial graphite bearing only 5% by weighs of Cu for maintaining a discharging capacity of 250 mAh/g is approximately 1.6, and the charging-discharging velocity 5 of the negative electrode G made of artificial graphite bearing 2.5% by weight of Ag and 2.5% by weight of Cu relating to the present invention for maintaining a discharging capacity of 250 mAh/g is approximately 3.2.

Similar tests as the above were performed on the negative electrodes A, B, C, D, and F, and approximately the same results as the negative electrode E were obtained.

(Embodiment 8)

The powder F obtained in embodiment 6 was thermally treated at 550° C. for 3 hours in a stream of 4% $H_2$/He. In an X-ray analysis of the powder, a diffraction line based on an alloy in addition to the diffraction lines of metallic Cu and Sn were observed. Using the heat treated powder, the same evaluation test of the negative electrode as used in embodiment 7 was performed. The discharging capacity was approximately the same value as that of the negative electrode using the powder F.

(Embodiment 9)

Powder was obtained in accordance with the same operations as used in embodiment 1 except for mixing the Cu and Ag so that the ratio of Cu:Ag by weight became 3:1. Using the obtained powder, the same evaluation test of the negative electrode as used in embodiment 7 was performed. The discharging capacity was approximately the same value as that of the negative electrode using the powder A.

(Embodiment 10)

Powder was obtained in accordance with the same operations as used in embodiment 1 except for mixing the Cu and Ag so that the ratio of Cu:Ag by weight became 1:3. Using the obtained powder, the same evaluation test of the negative electrode as used in embodiment 7 was performed. The discharging capacity was approximately the same value as that of the negative electrode using the powder A.

(Embodiment 11)

Powder was obtained in accordance with the same operations as used in embodiment 1 except for mixing the Cu and Ag so that the ratio of Cu:Ag by weight became 9:1. Using the obtained powder, the same evaluation test of the negative electrode as used in embodiment 7 was performed. The obtained discharging capacity was 350 mAh/g in comparison with 370 mAh/g of the negative electrode using the powder A.

(Embodiment 12)

Powder was obtained in accordance with the same operations as used in embodiment 1 except for mixing the Cu and Ag so that the ratio of Cu:Ag by weight became 1:9. Using the obtained powder, the same evaluation test of the negative electrode as used in embodiment 7 was performed. The obtained discharging capacity was 360 mAh/g.

(Embodiment 13)

Powder was obtained in accordance with the same operations as used in embodiment 1 except for replacing 20 parts by weight of the artificial graphite with amorphous graphite having a lattice spacing of 3.85 Å, which was determined by an X-ray analysis of dooz planes. Using the obtained powder, the same evaluation test of the negative electrode as used in embodiment 7 was performed. The obtained discharging capacity was approximately the same value as that of the negative electrode using the powder A.

(Embodiment 14)

Figure 4:
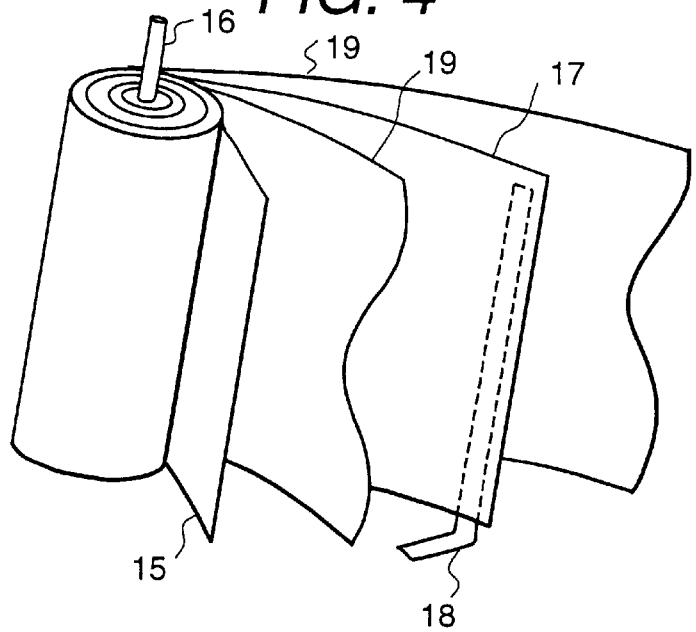
FIG. 4 is a diagrammatic partially exploded view indicating the composition of a cylindrical battery of the present invention.

A battery comprising a positive electrode 15, a negative electrode 17, and a separator mace of a porous film of polyethylene of 25 μm thickness, all of which were wound in the manner as shown in FIG. 4, and contained in a battery can 14 mm in outer diameter and 47 mm length, was manufactured using an electrolysis solution of 1M $LiPF_6$/EC-DMC, and its characteristics were evaluated.

The positive electrode was manufactured by applying a mixture of $LiCoO_2$ as an active material, artificial graphite, and PVDF in a ratio of 87:9:4 by weight onto both surfaces of an aluminum foil of 20 μm thickness, drying it, and drawing it so that the coating on the each of the surfaces of the foil to be 90 μm. The negative electrode was manufactured by applying a mixture of the powder E obtained in embodiment 5 and PVDF in a ratio of 9:1 by weight onto both surfaces of a copper foil of 20 μm thickness, drying it, and drawing it so that the coating on the each of surfaces of the foil came to be 58 μm.

The testing conditions were 1 C as the charging-discharging velocity, 4.2 V as the charge-terminating voltage, and 2.5 V as the discharge-terminating voltage.

As a result, the battery achieved 350 wh/l of the energy density, and indicated a stable performance up to 300 cycles.
(Embodiment 15)

An embodiment of a lithium ion secondary battery assembled with the negative electrode and the positive electrode using manganese group oxides containing lithium will be described hereinafter.

The material for the negative electrode was prepared as follows. Artificial graphite treated for high purification (lattice spacing d002=3.359 Å, size of crystal lattice Lc=540 Å, specific surface area=10 m$^2$/g) in an amount equal to 9.5 g was suspended into 450 ml of wafer containing 25 ml of ethanol.

The suspension was heated to 55° C. While stirring vigorously, 0.39 g of silver nitrate (AgNO$_3$) and 0.95 g of copper nitrate (Cu(NO$_3$)$_2$·3H$_2$O) were added and dissolved into the suspension. One hundred milliliters of water containing 8 ml of hydrazine (N$_2$H$_4$) was added dropwise to the solution with a micro-tube-pump for three hours to complete a simultaneous reducing reaction. Then, the reactant was filtered, washed, and the obtained solid body was dried at 350° C. for 6 hours in a vacuum. The metallic contents determined by chemical analysis in the obtained powder A were 2.45% by weight of Ag, and 2.32% by weight of Cu in comparison with an added amount of 2.5% by weight of each element. Existing conditions of Ag and Cu were studied by an X-ray diffraction method, and an extremely small diffraction line of cuprous oxide (Cu$_2$O) was observed in addition to diffraction lines of metallic Ag and metallic Cu. Then, the dispersing condition of Ag and Cu were studied by energy dispersion type electronic probe microanalysis. It was found that the Ag and Cu particles were distributed on the whole surface of the graphite particles, and some concentration at the side surface of the graphite particles was observed. The size of the metallic particles was observed with a transmission electron microscope, and it was found that particles of hundreds of angstroms in diameter were dispersed almost uniformly.

The carbon material was mixed with PVDF as a binder so that a ratio by weight of the powder and the PVDF was 90:10. A paste was prepared by adding NMP to the mixture for dissolving the PVDF. The paste was applied onto a collector made of a copper foil of 23 μm thickness. The collector was dried in a vacuum at 80° C. for 3 hours after being dried in air. Thereafter, the collector was fabricated into a negative electrode using a pressure of 0.5 ton/cm$^2$, and subsequently the fabricated negative electrode was dried in a vacuum at 120° C. for 2 hours. The mixed agents density of the negative electrode was approximately 1.5 g/cm$^3$. In order to confirm the performance of the electrode, a battery was assembled with the negative electrode, an opposed electrode made of Li metal, a separator made of PE group porous film, 1M-LiPF$_6$/EC-DMC (1:1) as an electrolysis solution, and a reference electrode made of Li metal. Using the above battery, cycle tests were performed with a charging-discharging velocity of 80 mA per 1 g of carbon, and a potential width of 0.01 V~1.0 V. The observed discharging capacity was 370 Ah/kg.

A positive electrode was prepared as follows. A paste was prepared by dissolving 87% by weight of LiMn$_2$O$_4$ having an average particle diameter of approximately 20 μm, and a single phase, of which the lattice constant was a=8.21~8.25 angstrom as a material for the positive electrode material, 8.7% by weight of graphite having an average particle diameter of 5 μm as a conductive material, and 4% by weight of PVDF as a binder, into N-methyl-2-pyrrolidone (abbreviated as NMP, hereinafter), and mixing. The paste was applied onto an aluminum foil of 20 μm thickness and was dried in a vacuum at 80° C. for 3 hours after being dried in air. Thereafter, the aluminum foil was fabricated into a positive electrode using a pressure of approximately 2.0 ton/cm$^2$, and subsequently the fabricated positive electrode was dried in a vacuum at 120° C. for 2 hours. The density of the mixed agents layer of the positive electrode was approximately 2.8 g/cm$^3$. A battery was assembled with the obtained positive electrode, an opposed electrode made of Li metal, a separator made of PE group porous film, 1M-LiPF$_6$/EC-DMC (1:1) as an electrolysis solution, and a reference electrode made of Li metal. Using the above battery, the performance of the electrode was confirmed by a charging-discharging test with a potential width of 4.3 V~3.0 V. The observed initial capacity was 128 mAh/kg.

An example of an AA battery using the Mn group positive electrode and the negative electrode made of graphite bearing metal, the performance of both of which was confirmed as mentioned above, will be described hereinafter.

The positive electrode was prepared as follows. A passe was prepared by dissolving end mixing 87% by weight of the above LiMn$_2$O$_4$ as a material for the positive electrode active material, 8.7% by weight of graphite having an average particle diameter of 5 μm as a conductive material, and 4.3% by weight of PVDF as a binder, into NMP. The paste was applied onto both planes of an aluminum foil of 20 μm thickness, and was dried at 80° C. for 3 hours. Thereafter, the aluminum foil was rolled with a roller press until the density of the mixed agent layer reached approximately 2.86 g/cm$^3$, and fabricated into the shape of a positive electrode. The positive electrode was obtained by drying the fabricated body in a vacuum at 120° C. for 2 hours.

The negative electrode was prepared as follows. A paste was prepared by mixing the carbon material A bearing Ag—Cu particles, having particle diameters of approximately 100 angstrom, obtained by the above mentioned method with PVDF as a binder so as to be 10% by weight with respect to the carbon material, and dissolving the mixture into NMP. The paste was applied onto both surfaces of a collector made of a copper foil of 20 μm thickness by 75 μm thickness onto each surface, and was dried at 80° C. for 3 hours. Thereafter, the copper foil was rolled with a roller press until the mixed agents density reached approximately 1.57 g/cm$^3$, and fabricated into the shape of a negative electrode. The negative electrode was obtained by drying the fabricated body in a vacuum at 120° C. for 2 hours.

A battery was assembled with a combination of the obtained positive electrode 15 having a positive electrode terminal 16 and the negative electrode 17 having a negative electrode terminal 18, and a separator 19 made of a PE group porous film of 25 μm thickness by winding them in the manner indicated in FIG. 4, and the assembly was contained in a battery can 14 mm in outer diameter and 47 mm in length. As the electrolysis solution, 1M-LiPF$_6$/EC+DMC (1:2) was used. Design values of the energy density of the battery are shown in Table 2.

In accordance with an evaluation test, the initial capacity of 520 mAh was obtained, and the volumetric energy density of 270 Wh/1 was obtained in comparison with the design value of 273 Wh/1.

TABLE 2

|  | Positive electrode | Negative electrode |
|---|---|---|
| Active material | LiMn$_2$O$_4$ | 2.5% Ag—2.5% Cu on artificial graphite |
| Active material capacity (mAh/g) | 128 | 370 |
| Retention (mAh/g) | 6 | 60 |
| Electrode density (g/cm$^3$) | 2.86 | 1.67 |
| Electrode width (cm) | 4.0 | 4.1 |
| Electrodelength (cm) | 23.5 | 28 |
| Electrode capacity (mAh) | 628 | 538 |
| Collector thickness ($\mu$m) | 20 | 20 |
| Separator thickness ($\mu$m) | 25 | |
| Battery outer size (mm) | 14 $\phi$ × 47 | |
| Battery volume (cm$^3$) | 7.5 | |
| Battery capacity (mAh) | 525 | |
| Average operation voltage (V) | 3.9 | |
| Energy density(Wh/g) | 102.3 | |
| Energy density(Wh/l) | 273.5 | |

(Comparative Example 3)

A paste was prepared by mixing artificial graphite (8.7% by weight) as a conductive material, lithium cobaltate (87% by weight) as a material for the positive electrode active material, and PVDF (4.3% by weight) dissolved in N-methyl-pyrrolidone (NMP) as a binder. The paste was applied onto both planes of an aluminum foil of 20 $\mu$m thickness, and was dried at 80° C. for 3 hours. Thereafter, the aluminum foil was fabricated into the shape of a positive electrode. The positive electrode was obtained by drying the fabricated body in a vacuum at 120° C. for 2 hours. The density of the mixed agents layer of the positive electrode was approximately 3.0 g/cm$^3$.

The negative electrode was prepared as follows. A paste was prepared by mixing artificial graphite with PVDF as a binder so as to be 10% by weight to the graphite, and dissolving the mixture into NMP. The paste was applied onto both surfaces of a collector made of a copper foil of 20 $\mu$m thickness, and was dried at 80° C. for 3 hours. Thereafter, the copper foil was rolled with a roller press until the mixed agents density reached approximately 1.53 g/cm$^3$, and fabricated into the shape of a negative electrode. The negative electrode was obtained by drying the fabricated body in a vacuum at 120° C. for 2 hours.

A battery was assembled with a combination of the obtained positive electrode and the negative electrode, and a separator made of a PE group porous film of 25 $\mu$m thickness by winding them in the manner indicated in FIG. 4, and were contained in a battery can 14 mm in outer diameter and 47 mm in length. As the electrolysis solution, 1M-LiPF$_6$/EC+DMC (1:2) was used. The characteristics of the battery were evaluated. Design values of the energy density of the battery are shown in Table 3.

In accordance with an evaluation test, the initial capacity of 500 mAh was obtained, and the volumetric energy density of 250 Wh/1 was obtained in comparison with the design value of 253 Wh/1.

(Comparative Example 4)

A cylindrical battery was prepared by the same method as used in embodiment 15, except for adding only 1.7 g of AgNO$_3$ in the synthetic process of powder of Ag (10% by weight)/artificial graphite. Design values of the energy density of the battery are shown in Table 4.

In accordance with an evaluation test, the initial capacity of 500 mAh was obtained, and the volumetric energy density of 259 Wh/1 was obtained in comparison with the design value of 261 Wh/1.

TABLE 3

|  | Positive electrode | Negative electrode |
|---|---|---|
| Active material | LiCoO$_2$ | artificial graphite |
| Active material capacity (mAh/g) | 145 | 300 |
| Retention (mAh/g) | — | 70 |
| Electrode density (g/cm$^3$) | 3.03 | 1.53 |
| Electrode width (cm) | 4.0 | 4.1 |
| Electrodelength (cin) | 24 | 28 |
| Electrode capacity (mAh) | 655 | 531 |
| Collector thickness ($\mu$m) | 20 | 20 |
| Separator thickness ($\mu$m) | 25 | |
| Battery outer size (mm) | 14 $\phi$ × 47 | |
| Battery volume (cm$^3$) | 7.5 | |
| Battery capacity (mAh) | 507 | |
| Average operation voltage (V) | 3.7 | |
| Energy density(Wh/g) | 89.2 | |
| Energy density(Wh/l) | 253.3 | |

TABLE 4

|  | Positive electrode | Negative electrode |
|---|---|---|
| Active material | LiMn$_2$O$_4$ | 10% Ag-artificial graphite |
| Active material capacity (mAh/g) | 128 | 335 |
| Retention(mAh/g) | 6 | 70 |
| Electrode density (g/cm$^3$) | 2.86 | 1.56 |
| Electrode width(cm) | 4.0 | 4.1 |
| Electrodelength(cm) | 24.5 | 28 |
| Electrode capacity (mAh) | 628 | 517 |
| Collector thickness ($\mu$m) | 20 | 20 |
| Separator thickness ($\mu$m) | 25 | |
| Battery outer size (mm) | 14 $\phi$ × 47 | |
| Battery volume (cm$^3$) | 7.5 | |
| Battery capacity (mAh) | 501 | |
| Average operation voltage (V) | 3.9 | |
| Energy density(Wh/g) | 97.6 | |
| Energy density(Wh/l) | 260.5 | |

Figure 5:
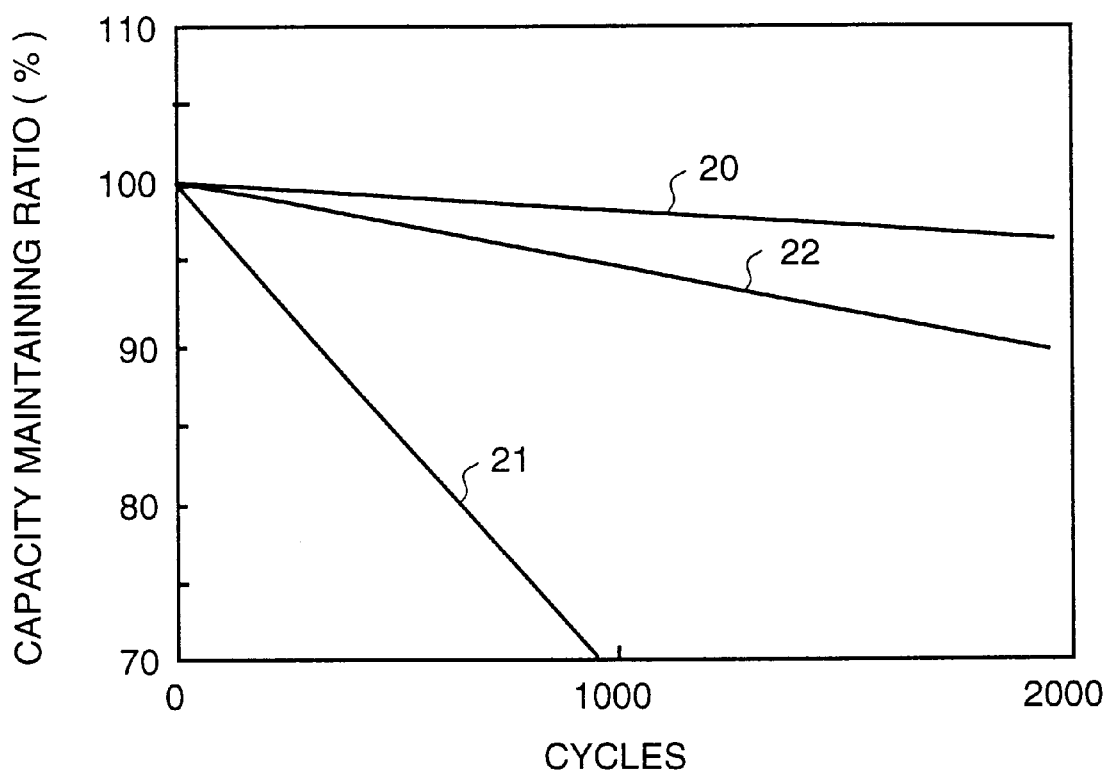
FIG. 5 is a graph indicating the cycle characteristics of the cylindrical battery of the present invention.

Charging-discharging cycle tests were performed on the batteries obtained in embodiment 15, and comparative examples 3 and 4 with 1 C of charging-discharging velocity, 4.2 V of charging terminating voltage, and 3.0 V of discharging terminating voltage for the battery obtained in embodiment 15, and 2.5 V of discharging terminating voltage for the batteries obtained in comparative examples 3 and 4. Observed capacity maintaining ratios are shown in FIG. 5. The battery of embodiment 15 (line 20) indicates a high capacity maintaining ratio such as 98% even after 1000 cycles in comparison with the battery of comparative example 3 (line 21).

(Embodiment 16)

Cylindrical batteries were manufactured by the same method as used in embodiment 15 except for altering the materials for the negative electrodes. Rate characteristics, cycle characteristics, and the safety of the manufactured batteries were evaluated.

Synthetic methods of making each of the negative electrodes are mentioned hereinafter.

The carbon material B was prepared by the following steps. Twenty-five (25) ml of ethanol was mixed with 450 ml of water, and the mixture was heated to 55° C. Then, 0.5 g of potassium hydrogen phthalate was added and dissolved into the mixture. Subsequently, 0.39 g of silver nitrate ($AgNO_3$) and 0.95 g of copper nitrate ($Cu(NO_3)_2 \cdot 3H_2O$) were added and dissolved into the solution while stirring vigorously. Then, 9.5 g of artificial graphite treater for high purification (lattice spacing d002=3.359 Å, size of crystal lattice Lc=540 Å, specific surface area=10 $m^2/g$) was suspended into the solution.

An aqueous solution of $NaBH_4$ (0.5% by weight) was added dropwise to the suspended solution with a microtube-pump for three hours to complete a simultaneous reducing reaction. Then, the reactant was filtered, washed, and the obtained solid body was dried at 350° C. for 6 hours in a vacuum. The obtained carbon material B was almost as same as the powder A obtained in embodiment 15. The diameter of metallic particles borne on the carbon material was smaller than that of the powder A, and the distribution of the metallic particles was improved. The initial discharging capacity of the carbon material B was 375 Ah/kg.

The carbon material C was prepared by the following steps. After adding and dissolving 0.475 g of $SnCl_2 2 H_2O$ and 0.95 g of copper nitrate ($Cu(NO_3)_2 \cdot 3H_2O$) into a mixed solution of 2 ml of acetic acid—25 ml of ethanol—25 ml of $H_2O$, the volume of the solution was adjusted to 400 ml by adding distilled water. Then, 9.5 g of artificial graphite treated for high purification was suspended into the solution. The suspended solution was heated to approximately 50 C. Then, an aqueous solution containing 1.7 g of $NaBH_4$ in 100 ml of water was added dropwise to the suspended solution to complete a reducing reaction. The carbon material C was obtained by filtration and washing of the reactant, and by drying the obtained solid body at 150° C. for 20 hours in a vacuum. In an X-ray diffraction analysis of the carbon material C, the diffraction lines of metallic Cu and Sn and a trace of cuprous oxide, in addition to the diffraction line based on graphite, were observed. The initial discharging capacity of the carbon material C was 365 Ah/kg.

The carbon materials D and E were synthesized as follows. The carbon material was obtained in accordance with the same operations as used in embodiment 15 except for mixing the Cu and Ag so that the ratio of Cu:Ag by weight became 3:1. The carbon material E was obtained in accordance with the same operations as used in embodiment 15 except for mixing the Cu and Ag so that the ratio of Cu:Ag by weight became 1:3. The carbon materials D and E indicated almost equivalent discharging capacities as that of the carbon material A.

The carbon materials F and G were synthesized as follows. The carbon material was obtained in accordance with the same operations as used in embodiment 15 except for mixing the Cu and Ag so that the ratio of Cu:Ag by weight became 9:1. The carbon material G was obtained in accordance with the same operations as used in embodiment 15 except for mixing the Cu and Ag so that the ratio of Cu:Ag by weight became 1:9. Each of the carbon materials F and G indicated the discharging capacity of 350 Ah/kg for F and 360 Ah/kg for G.

The carbon material H bearing only a metal which forms an alloy with lithium was synthesized as comparative example 5 as follows. The carbon material H, which was a powder of 5% by weight Ag/artificial graphite, was obtained in accordance with the same operations as used in obtaining the carbon material B except only 0.98 g of $AgNO_3$ was added. The carbon material H had an initial discharging capacity of 335 Ah/kg.

Using the above carbon materials A~H for the negative electrodes, and $LiMn_2O_4$ as the material for the positive electrode, cylindrical batteries were manufactured in the same way as embodiment 15. The performance of the manufactured cylindrical batteries and the cylindrical battery obtained in comparative example 3 is indicated in Table 5.

Charging-discharging cycles which are required for decreasing the discharging capacity to 80% of the rated discharging capacity when charging-discharging are performed by 1 C, and a ratio of 0.2 C discharging capacity when discharging velocity is altered are also indicated in Table 5. Furthermore, the maximum latent amounts of lithium, which deposit on the negative electrode when overcharging these batteries, are indicated.

TABLE 5

| Batt.[1] system | Posit. elec.[2] | Batt. capacity (mAh) | Volume energy density (Wh/l) | Cycles required 80%[3] | Discharging capacity ratio[4] | Latent lithium amount (mAh) | Temperature raise[4] |
|---|---|---|---|---|---|---|---|
| E[6]-15A | $LiMn_2O_4$ | 525 | 273.1 | 3121 | 95 | 85 | None |
| E-16B | $LiMn_2O_4$ | 525 | 273.1 | 3300 | 96 | 78 | None |
| E-16C | $LiMn_2O_4$ | 525 | 273.1 | 2580 | 92 | 92 | None |
| E-16D | $LiMn_2O_4$ | 525 | 273.1 | ≧3000 | 95 | 85 | None |
| E-16E | $LiMn_2O_4$ | 525 | 273 1 | ≧3000 | 95 | 85 | None |
| E-16F | $LiMn_2O_4$ | 517 | 268.7 | 2393 | 96 | 89 | None |
| E-16G | $LiMn_2O_4$ | 514 | 267.1 | 2051 | 94 | 55 | None |

TABLE 5-continued

| Batt.[1] system | Posit. elec.[2] | Batt. capacity (mAh) | Volume energy density (Wh/l) | Cycles required 80%[3] | Discharging capacity ratio[4] | Latent lithium amount (mAh) | Temperature raise[4] |
|---|---|---|---|---|---|---|---|
| Com[7]-5H | LiMn$_2$O$_4$ | 501 | 260.5 | 2035 | 78 | 82 | Slight |
| Com-3 | LiCoO$_2$ | 507 | 253.3 | 601 | 88 | 602 | Obs[8] |

Remarks:
[1]Battery system,
[2]Positive electrode material
[3]Cycles required for reaching 80% of rated capacity when discharging by 1 C,
[4](discharging capacity by 2 C/0.2 C discharging capacity) × 100(%)
[5]Temperature raise at 150% overcharging.
[6]Embodiment
[7]Comparative example
[8]Observed The latent deposited amount of lithium is less than 100 mAh in all embodiments of the present invention in comparison with 602 mAh for the battery in comparative example 3. It is indicated that the latent deposited amount of lithium of the battery relating to the present invention is less than 40% of the rated battery capacity, and that lithium deposition at overcharging is less than that of a conventional cobalt group battery. It is also indicated that the battery having more improved safety can be realized.

The same advantages can be achieved when a battery is manufactured with these negative electrode materials and the positive electrode materials such, as the substituted type or additive type manganese group spinel compounds having stable cycle reversibility expressed by either of formulas of Li$_x$Mn$_{2-y}$M$_y$O$_{4-z}$) where 0<x≦1.3, 0≦y<2, 0≦z<2, M: at least one element selected from a group consisted of B, Al, Si, Ge, Ga, Fe, Cu, Co, Mg, Ca, Ti, V, Cr, Ni, Ag, Sn, and second transition metallic elements) Li$_{1+x}$Mn$_{2-x}$O$_z$ (where, 0<x≦0.3, 0≦z<2), and Li$_x$Mn$_y$M$_{1-y}$O$_2$ (where, 0<x≦1.3, 0≦y<1, M: at least one element selected from a group consisted of B, Al, Si, Ge, Ga, Fe, Cu, Co, Mg, Ca, Ti, V, Cr, Ni, Ag, Sn, and second transition metallic elements). Particularly, when the compound expressed by either of the formulas of Li$_x$Mn$_{2-y}$M$_y$O$_{4-z}$ (where, 0<x≦1.3, 0≦y<0.1, 0≦z<2, M: at least one element selected from a group consisted of B, Mg, Ca,), and Li$_x$Mn$_{2-y}$M$_y$O$_{4-z}$ (where, 0<x≦1.3, 0≦y<0.3, 0<z<2, M: at least one element selected from a group consisted of Al, Si, Ge, Ga, Fe, Cu, Co, Ti, V, Cr, Ni), the cycle characteristics are improved, and the 0.2 C discharging capacity is high when the discharging current is increased.

In the above embodiments, LiMn$_2$O$_4$ was used as the material for the positive electrode, and Ag—Cu, or An—Cu was used as the material for the negative electrode. However, the same advantages can be achieved by making a battery with carbon material bearing an alloy composed of at least a metal which forms an alloy with lithium such as Al, Sb, B, Ba, Bi, Cd, Ca, Ga, In, Ir, Pb, Hg, Si, Ab, Sr, Te, Ti, and Sn, and at least a metal which does not form any alloy with lithium such as Fe, Ni, Cu, Pt, and Au as the material for the negative electrode, and by using the above mentioned Mn compounds as the material for the positive electrode. (Embodiment 17)

A cylindrical battery of 18 mm in outer diameter and 65 mm in length was manufactured with the same composition as the battery of the present invention mentioned in embodiment 15. A set of batteries was formed with the above battery as a battery pack for an internal power source of a portable personal computer. As a comparative example, a cylindrical battery of 18 mm in outer diameter and 65 mm in length was manufactured with the same composition as the battery mentioned in comparative example 3. A set of batteries was formed with the above battery as a battery pack. The battery pack composed of the batteries of the present invention had preferable rate characteristics, and the charging time could be decreased by 60% in comparison with the comparative example. The capacity maintaining ratio after repeating 100 cycles of charging-discharging was superior, being at least 99%. Therefore, a portable personal computer provided with the battery relating to the present invention has a short stand-by time for charging, and the easiness of using the computer is significantly improved. Here, taking a portable personal computer as an example, any other apparatus provided with the battery relating to the present invention can be improved in performance as well in comparison with a conventional apparatus.

Although the invention has been described in its preferred form with a certain degree of particularity, it is to be understood that the present invention is not limited to the specific embodiments, but various changes in the preferred embodiments may be made for obtaining the same advantages without departing from the spirit and the scope of the invention as hereinafter claimed.

What is claimed is:

1. A lithium secondary battery based on an intercalation-deintercalation reaction of lithium ions comprising a positive electrode, a negative electrode, and an electrolysis solution, wherein said negative electrode is composed of a collector holding carbon particles, and said carbon particles bear one of the following component (a) and component (b):
   (a) both a metal which forms an alloy with lithium and a metal which does not form any alloy with lithium, and
   (b) an alloy of a metal which forms an alloy with lithium and a metal which does not form any alloy with lithium.

2. A lithium secondary battery as claimed in claim 1, wherein
   each of said metal which forms an alloy with lithium and said metal which does not form any alloy with lithium has a particle diameter equal to or less than 1000 Å.

3. A lithium secondary battery as claimed in claim 1, wherein
   a ratio by weight of said metal which forms an alloy with lithium to said metal which does not form any alloy with lithium is in the range of 1:9~9:1.

4. A lithium secondary battery as claimed in claim 1, wherein
   said metal, which forms an alloy with lithium, forms an alloy with lithium by an atomic ratio equal to or less than seven metallic atoms per one lithium atom.

5. A lithium secondary battery as claimed in claim 1, wherein
each of said metal which forms an alloy with lithium and said metal which does not form any alloy with lithium has a particle diameter equal to or less than 1000 Å, and
said metal which forms an alloy with lithium forms an alloy by an atomic ratio equal to or less than seven metallic atoms per one lithium atom.

6. A lithium secondary battery as claimed in claim 1, wherein
said carbon particles of said negative electrode are made of a graphite group carbon material, or an amorphous group carbon material, and the metals borne by said carbon particles contain Cu and at least one element selected from a group consisting of Al, Ag, and Sn.

7. A lithium secondary battery as claimed in claim 1, wherein
said positive electrode contains a transition metallic oxide containing Mn.

8. A lithium secondary battery as claimed in claim 7, wherein
a composition of said transition metallic oxide containing Mn is expressed by one of the following formulas:
$LiMn_2O_4$, $Li_{1+x}Mn_{2-x}O_{4-z}$, $Li_xMn_yM_{1-y}O_2$ $0<x\leq1.3$, $0\leq y<1$, M: at least one element selected from the group consisting of B, Al, Si, Ge, Ga, Fe, Cu, Co, Mg, Ca, Ti, V, Cr, Ni, Ag, Sn, $Li_xMn_{2-y}M_yO_{4-z}$ ($0<X\leq1.3$, $0\leq y<2$, $0\leq z<2$ M: at least one element selected from the group consisting of B, Al, Si, Ge, Ga, Fe, Cu, Co, Mg, Ca, Ti, V, Cr, Ni, Ag, Sn, and secondary transition metallic elements,
$Li_xMn_{2-y}M_yO_{4-z}$ ($0<X\leq1.3$, $0\leq y<0.1$, $0\leq z<2$ M: at least one of B, Mg, and Ca), $Li_xMn_{2-y}M_yO_{4-z}$ ($0<X\leq1.3$, $0\leq z<2$ M: at least one of Al, Si, Ge, Ga, Fe, Cu, Co, Ti, V, Cr, and Ni).

9. An electric vehicle provided with a driving motor, the power source of which is the lithium secondary battery claimed in claim 1.

10. A home electronic apparatus, a home electric apparatus, and a portable apparatus provided with the lithium secondary battery claimed in claim 1 as a driving power source.

11. A personal computer, a portable information terminal, a portable electronic apparatus, and a small scale home power storage apparatus provided with the lithium secondary battery claimed in claim 1 as a power source.

12. A motorcycle provided with a driving motor, of which power source is the lithium secondary battery claimed in claim 1.

13. A lithium secondary battery as claimed in claim 1, wherein the average particle diameter of the carbon particles is at most 50 μm.

14. A lithium secondary battery as claimed in claim 13, wherein the average particle diameter of the carbon particles is in the range of 1–20 μm.

15. A lithium secondary battery as claimed in claim 1, wherein said carbon particles bear up to 30% by weight of one of component (a) and component (b), to the total weight of the carbon particles and said one of component (a) and component (b).

* * * * *